US012712927B2

(12) United States Patent
Bradley et al.

(10) Patent No.: US 12,712,927 B2
(45) Date of Patent: Aug. 18, 2026

(54) SEAMLESS MIGRATION OF GROUP MESSAGING SESSIONS AND METADATA ACROSS NETWORKS

(71) Applicant: T-Mobile USA, Inc., Bellevue, WA (US)

(72) Inventors: Taylor Ryan Bradley, Seattle, WA (US); Salman Karimpour, Mill Creek, WA (US); Farhood Mogharabin, Everett, WA (US); Ayman Zaki, Renton, WA (US)

(73) Assignee: T-Mobile USA, Inc., Bellevue, WA (US)

(*) Notice: Subject to any disclaimer, the term of this patent is extended or adjusted under 35 U.S.C. 154(b) by 361 days.

(21) Appl. No.: 18/593,192

(22) Filed: Mar. 1, 2024

(65) Prior Publication Data

US 2025/0280045 A1 Sep. 4, 2025

(51) Int. Cl.

| | |
|---|---|
| ***H04L 12/66*** | (2006.01) |
| ***H04L 65/1016*** | (2022.01) |
| ***H04L 65/1069*** | (2022.01) |

(52) U.S. Cl.

CPC ...... *H04L 65/1069* (2013.01); *H04L 65/1016* (2013.01)

(58) Field of Classification Search

CPC ..... H04L 51/04; H04L 51/56; H04L 65/1069; H04L 51/216; H04L 67/306; H04L 67/10; H04L 65/1093

See application file for complete search history.

(56) References Cited

U.S. PATENT DOCUMENTS

| | | | |
|---|---|---|---|
| 8,416,781 | B2 | 4/2013 | Shatsky et al. |
| 10,645,048 | B2 | 5/2020 | Synal et al. |
| 11,089,520 | B2 | 8/2021 | Zhu et al. |
| 11,128,485 | B2 | 9/2021 | Amin et al. |
| 11,812,496 | B2 | 11/2023 | Wang et al. |
| 2007/0162605 | A1 | 7/2007 | Chalasani et al. |
| 2012/0150968 | A1 | 6/2012 | Yasrebi et al. |
| 2012/0166652 | A1 | 6/2012 | Bouthemy |

(Continued)

FOREIGN PATENT DOCUMENTS

| | | |
|---|---|---|
| CN | 113438665 B | 7/2022 |
| CN | 112187488 B | 9/2022 |

(Continued)

*Primary Examiner* — Kharye Pope

(74) *Attorney, Agent, or Firm* — Ashurst Perkins Coie US LLP

(57) ABSTRACT

A messaging network causes seamless migration of a group chat's metadata to a target messaging network after the group chat has migrated to the target messaging network, thus resulting in the target messaging network hosting the group chat. Metadata for a group chat (e.g., Open Group Chat (OGC) in rich communication services (RCS) messaging) defines various group chat aspects, such as the participants, a specified group name, file size limits, and the like. The messaging network robustly determines whether it remains responsible for hosting the group chat according to which messaging network is serving the creator user. If the messaging network determines that a new messaging network is now responsible for hosting the group chat, the messaging network triggers re-provisioning of the group chat metadata at the new messaging network. The messaging network also cleans up the group chat metadata that it had locally stored and managed.

20 Claims, 8 Drawing Sheets

(56) References Cited

U.S. PATENT DOCUMENTS

| | | | |
|---|---|---|---|
| 2020/0323029 | A1 | 10/2020 | Lu et al. |
| 2023/0180310 | A1 | 6/2023 | Wang et al. |
| 2023/0353985 | A1 | 11/2023 | Dar et al. |

FOREIGN PATENT DOCUMENTS

| | | | |
|---|---|---|---|
| EP | 3742695 | A1 | 11/2020 |
| EP | 3598799 | B1 | 6/2022 |
| EP | 3790305 | B1 | 3/2023 |
| JP | WO2009113561 | A1 | 7/2011 |
| KR | 100957636 | B1 | 5/2010 |
| WO | 2013153021 | A1 | 10/2013 |
| WO | 2018126461 | A1 | 7/2018 |
| WO | 2022005207 | A1 | 1/2022 |
| WO | 2022199275 | A1 | 9/2022 |

SEAMLESS MIGRATION OF GROUP MESSAGING SESSIONS AND METADATA ACROSS NETWORKS

BACKGROUND

Rich Communication Services (RCS) is a communication protocol for messaging services with enhanced capabilities and additional features over older messaging services such as Short Messaging System (SMS). For example, RCS provides advanced group chat capabilities that allow users to name a group chat session, set an avatar or picture to represent the group chat session, and add or remove users throughout the course of the group chat session. Various features and protocol aspects of RCS are defined in specifications established by the Global System for Mobile Communications Association (GSMA).

Telecommunication networks can host infrastructure for providing RCS messaging for their network subscribers. There are also other RCS or advanced messaging platforms or systems not necessarily tied to a telecommunication network. For example, Google operates a universal messaging platform known as Google Messages (or also known as Messenger, Android Messages, or Messages) that employs RCS capabilities for the Android ecosystem. Distinct from RCS messaging, Apple provides iMessage messaging services to its ecosystem of users, and iMessage provides similar advanced features for messaging and group messaging.

BRIEF DESCRIPTION OF THE DRAWINGS

Detailed descriptions of implementations of the present invention will be described and explained through the use of the accompanying drawings.

Figure 1:
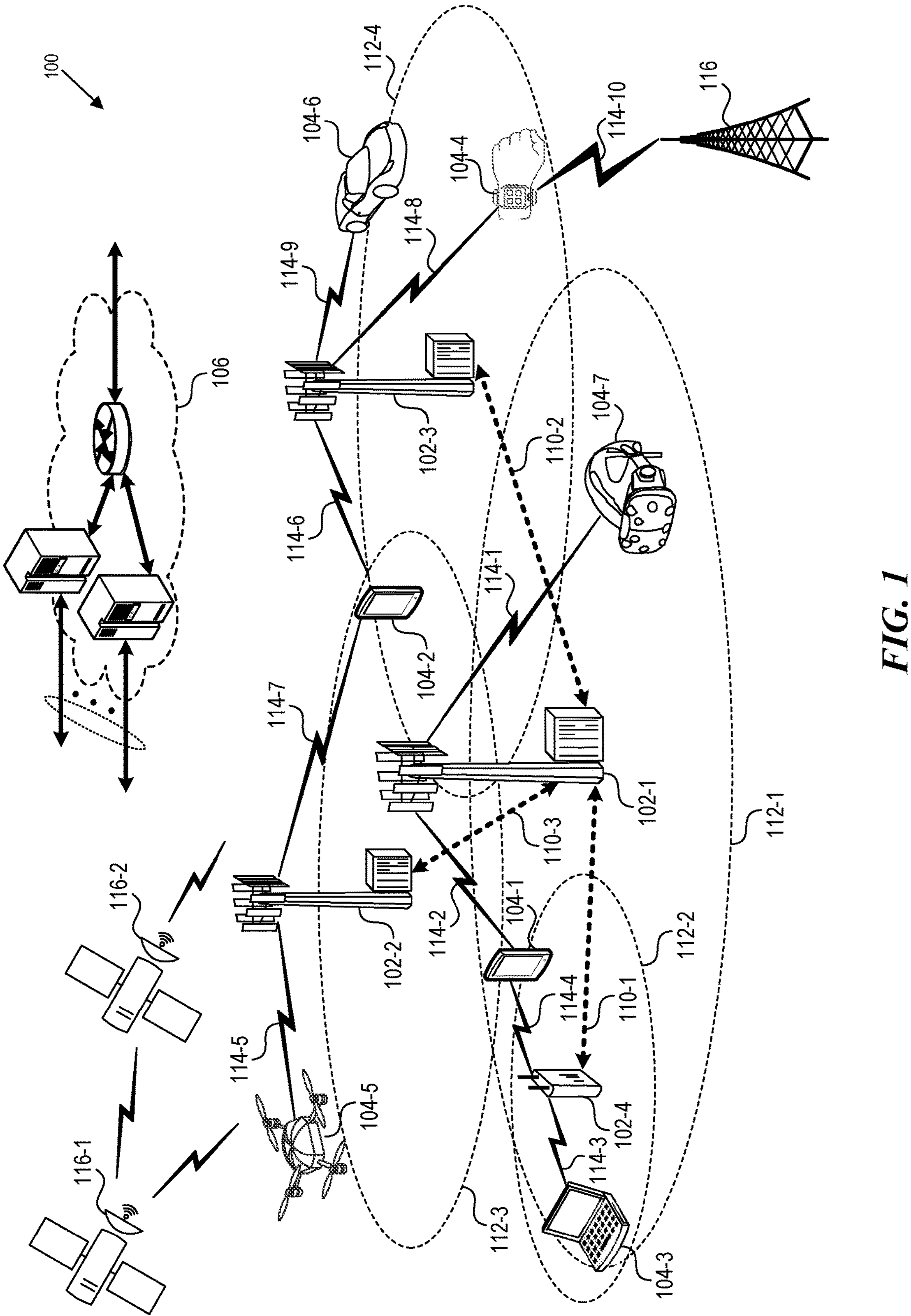
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Disclosed here are solutions for seamlessly migrating group messaging sessions and their metadata across different messaging networks. Metadata for a group chat or a group messaging session (e.g., Open Group Chat (OGC) under RCS) defines various aspects of the group chat, such as the users belonging to the group chat, a name assigned to the group chat, file size limits, and the like. Among the users belonging to the group chat, the metadata can also identify a creator user of the group chat (or similarly, a host user, an administrator user, a leader user). A group chat's metadata is created and then stored and managed by a messaging network or platform that serves the creator user with the messaging services (e.g., RCS messaging, Apple iMessage services, other advanced messaging protocols). For example, metadata for a group chat created by a T-Mobile subscriber is created and stored within an RCS infrastructure of T-Mobile's telecommunication network, while metadata for a different group chat created by an AT & T subscriber is created and stored within AT & T's RCS messaging network. This messaging network with which the creator user is associated holds the group chat's metadata, even if the group chat includes users associated with other messaging networks or platforms. In this way, the group chat's creator user also controls the group chat experience for the other users, because the particular messaging network that serves the creator user provisions or sets certain network-specific configurations for the group chat, such as group size limit, file size limit, ability to set group chat icons, and/or the like.

It is not uncommon for users to switch telecommunication network providers (e.g., from AT & T to T-Mobile), which can result in them being served by a different messaging network. Additionally, a messaging network operator may negotiate with a different messaging network for the different messaging network to begin serving certain users belonging to the network operator for messaging. For example, AT & T may migrate some users out to the Google Messages RCS platform (e.g., Jibe Cloud) so that AT & T's messaging network can cease serving those users for RCS messaging (these users may continue receiving other telecommunication services via AT & T network infrastructure). When the creator user of a given group chat is ported or migrated to a new messaging network, the new messaging network should assume responsibility for serving and managing the given group chat.

In these instances, unnecessary signalling and looping between the new messaging network and the old messaging network occurs, due to the old messaging network still holding the group chat's metadata and at least some users of the group chat still being configured to address the old messaging network for their group chat signalling. Additionally, by the old messaging network still holding the group chat's metadata, the group chat may improperly retain some network-specific configurations associated with the old messaging network instead of adopting the network-specific configurations of the new messaging network.

Accordingly, the disclosed embodiments reduce unnecessary cross-network signalling and improve provisioning and storage of group chat metadata across messaging networks. According to disclosed embodiments, a system for a first messaging network can robustly determine whether a group chat first created at the first messaging network has since migrated to a second messaging network. The group chat may have migrated on the basis of its creator user now being served by the second messaging network instead of the first messaging network. Upon determining that a group chat has migrated, the system for the first messaging network cleans up the group chat's metadata (e.g., by deleting the metadata, by deprecating the metadata in memory storage) and causes the second messaging network to assume responsibility over the group chat's metadata. In particular, the system can relay an error signal to a group chat user to trigger an error process by which the group chat user causes the group chat's metadata to be reestablished or re-provisioned at the second messaging network.

Thus, the disclosed embodiments cause a seamless migration of group chat metadata by a robust determination that the group chat metadata is no longer needed at an original messaging network and by triggering re-provisioning of the group chat metadata between a group chat user and a target messaging network. After the metadata migration, the first messaging network will no longer be needlessly looped into signalling for the group chat. The target or second messaging network is also able to more simply set network-specific configurations in the group chat's metadata, as contingent on the group chat being hosted by the second messaging network (or specifically, the group chat's creator user being served by the second messaging network). Further, through leveraging an error process for re-provisioning a group chat's metadata, the disclosed embodiments provide a seamless user experience, for example, by avoiding duplicate group chats appearing in a user's messaging client and querying again for a group chat name and/or icon.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Example Embodiments of Wireless Communications Systems

FIG. 1 is a block diagram that illustrates a wireless telecommunication network 100 ("network 100") in which aspects of the disclosed technology are incorporated. For example, the network 100 is configured to enable RCS communication for its subscribers. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, internet protocol (IP) connectivity (e.g., for RCS messaging), and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The coverage area 112 for a base station 102 can be divided into sectors making up only a portion of the coverage area (not shown). The network 100 can include base stations of different types (e.g., macro and/or small cell base stations). In some implementations, there can be overlapping coverage areas 112 for different service environments (e.g., Internet of Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term "eNBs" is used to describe the base stations 102, and in 5G new radio (NR) networks, the term "gNBs" is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances; etc.

A wireless device (e.g., wireless devices 104) can be referred to as a user equipment (UE), a customer premises equipment (CPE), a mobile station, a subscriber station, a mobile unit, a subscriber unit, a wireless unit, a remote unit, a handheld mobile device, a remote device, a mobile subscriber station, a terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102 and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites, such as satellites 116-1 and 116-2, to deliver services anywhere and anytime and provide coverage in areas that are unreachable by any conventional Terrestrial Network (TN). A 6G implementation of the network 100 can support terahertz (THz) communications. This can support wireless applications that demand ultrahigh quality of service (QOS) requirements and multi-terabits-per-second data transmission in the era of 6G and beyond, such as terabit-per-second backhaul systems, ultra-high-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low user plane latency. In yet another example of 6G, the network 100 can implement a converged Wi-Fi and Core architecture to increase and improve indoor coverage.

Example Embodiments of 5G Core Network Functions

Figure 2:
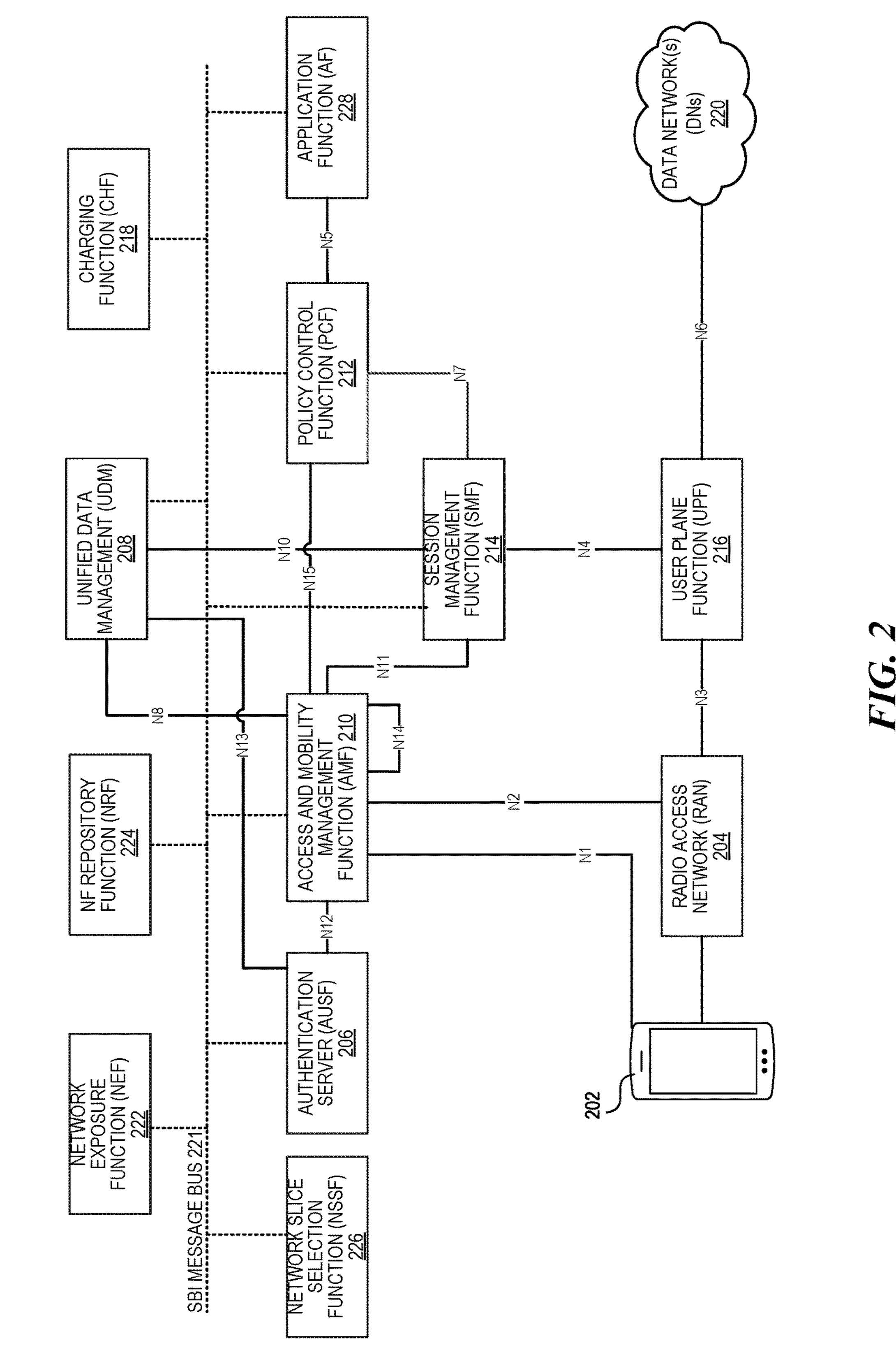
FIG. 2 is a block diagram that illustrates 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218. In some embodiments, these and/or other NFs constitute a messaging infrastructure that is configured to operate and provide messaging services including RCS messaging.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNS) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, an NF Repository Function (NRF) 224, a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, and service-level agreements and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS) and can provide authentication credentials while being employed by the AMF 210 and SMF 214 to retrieve subscriber data and context.

The PCF 212 can connect with one or more Application Functions (AFs) 228. The PCF 212 supports a unified policy framework within the 5G infrastructure for governing network behavior. The PCF 212 accesses the subscription information required to make policy decisions from the UDM 208 and then provides the appropriate policy rules to the control plane functions so that they can enforce them. The SCP (not shown) provides a highly distributed multi-access edge compute cloud environment and a single point of entry for a cluster of NFs once they have been successfully discovered by the NRF 224. This allows the SCP to become the delegated discovery point in a datacenter, offloading the NRF 224 from distributed service meshes that make up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224 use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework that, along with the more typical QoS and charging rules, includes network slice selection, which is regulated by the NSSF 226.

Example Embodiments for Migrating Metadata for Group Messaging Sessions

Embodiments disclosed herein enable seamless migration of a group chat's metadata across messaging networks, including causing an origin messaging network (or a "first" messaging network) to clean up the metadata and triggering a process in which a target messaging network (or a "second" messaging network) re-provisions the metadata locally. Technical benefits and improvements are provided by preventing unnecessary signaling between messaging networks after a group chat's migration. Doing so reduces load needlessly placed upon an origin messaging network for group chats for which the origin messaging network is no longer responsible. The disclosed solutions also enable accurate provisioning of group chat configurations according to the messaging network presently serving the group chat's creator user.

Figure 3A:
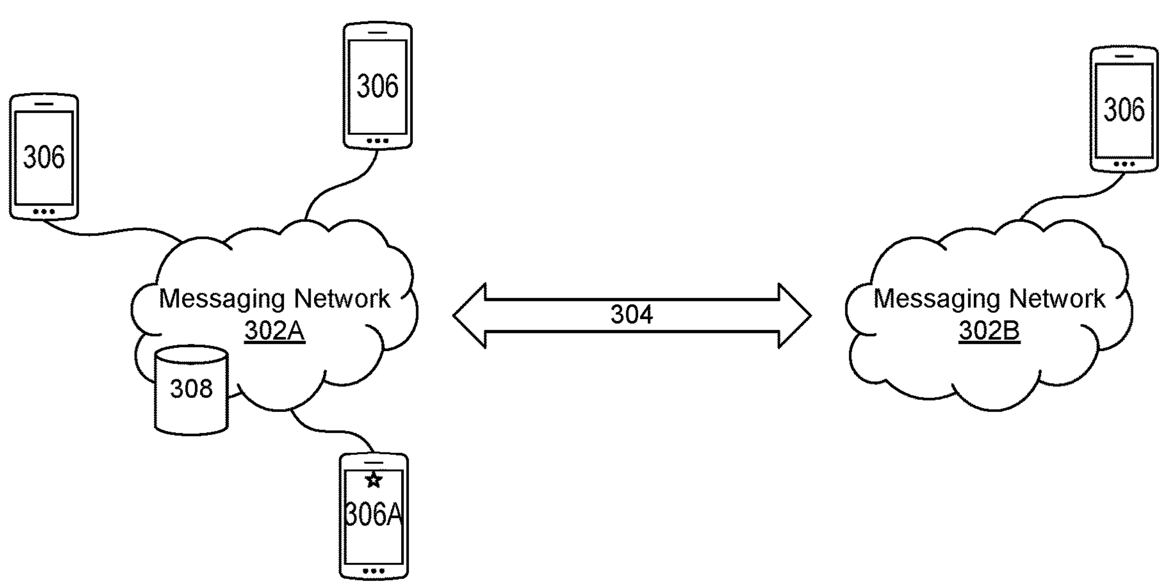
FIGS. 3A-3C are diagrams that illustrate migrations of group messaging sessions and associated metadata across messaging networks.

FIG. 3A illustrates an environment in which messaging services, including group chat or group messaging services, are provided to a plurality of users. In some embodiments, these messaging services include advanced group messaging capabilities, including OGC within RCS messaging. The advanced features and settings of a group chat or a group messaging session are defined and controlled by associated metadata (e.g., RCS OGC metadata).

In the illustrated embodiment, the environment includes a first messaging network 302A and a second messaging network 302B. The first messaging network 302A and the second messaging network 302B are networks, clouds, systems, servers, platforms, or communication infrastructure that provide messaging services to users. In some embodiments, a messaging network is included within a telecommunication network that provides various communication services to users, including advanced messaging. In such instances, the messaging network may be embodied by one or more application servers in a core network of the telecommunication network. In some embodiments, a messaging network may be a computing platform (e.g., a cloud computing platform, a distributed computing platform) that can deliver communication services to users whether via a telecommunication network or not. Examples may include Apple's iMessage cloud platform and a Google Messages platform that facilitates RCS services for users.

The first messaging network 302A and the second messaging network 302B are coupled by an interface 304 (e.g., a network-to-network interface (NNI)) that facilitates cross-network (e.g., cross-carrier, cross-operator) messaging between respective subscribers. For example, signals can be passed via the interface 304 to facilitate messaging between one user belonging to the first messaging network 302A and another user belonging to the second messaging network 302B. In some embodiments, multiple interfaces 304 may span between a given messaging network and multiple other messaging networks or platforms. As such, a given messaging network may be able to identify the messaging network that relays a messaging signal to the given messaging network based which interface the given messaging network receives the messaging signal.

In the illustrated example of FIG. 3A, a first or creator user 306A creates a group chat for a plurality of users 306 (including the creator user 306A). In some embodiments, the plurality of users 306 may include users that are served by different messaging networks. For example, one of the group chat members in the illustrated embodiment is served by the second messaging network 302B, while the remaining members are served by the first messaging network 302A. Messages and other signalling for the group chat may be relayed and delivered to the one member served by the second messaging network 302B via the interface 304.

In some embodiments, the group chat is created according to RCS protocols. In accordance with RCS protocols, the first messaging network 302A (e.g., an application server within a telecommunication network, a cloud platform) receives an ADHOC INVITE signal from the creator user 306A, which is indicative of a new group chat, and the first messaging network 302A creates metadata 308 for the new group chat. The metadata 308 includes various details about the new group chat including the participants, constraints such as group size limit and file size limit, available permissions for each participant, whether read receipts are enabled, whether typing indicators are enabled, and/or the like.

In creating the group chat, the first messaging network 302A sends (and relays, as applicable) invite signals (e.g., an INVITE fork in RCS) to all the participants. This signal that is sent to the participants may include an identifier associated with the first messaging network 302A, such as a conference focus universal resource indicator (URI). This identifier indicates who is hosting the group chat (i.e., the first messaging network 302A), and this identifier is used by participants in subsequent signalling for the group chat. Accordingly, a subsequent signal (e.g., an INVITE in RCS) from any participant is addressed and routed to the first messaging network 302A, which then acts to break out the signal to all other participants using the metadata 308 created and stored at the first messaging network 302A.

Figure 3B:
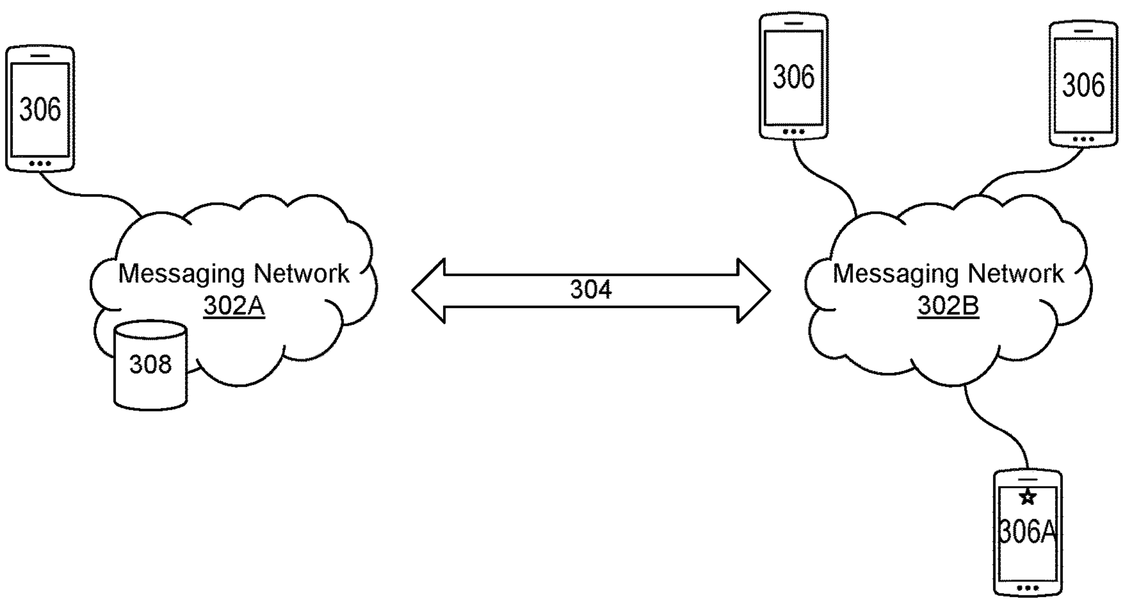

FIG. 3B demonstrates migration of a group chat. As used herein, migration of a group chat refers to the creator user 306A of the group chat being served by a new messaging network. For example, between FIG. 3A and FIG. 3B, the creator user 306A in the illustrated embodiment is now served by the second messaging network 302B instead of the first messaging network 302A. A creator user 306A may migrate to a new messaging network based on the creator user 306A porting to a new telecommunications provider, the creator user 306A being migrated between messaging networks, a creator user 306A changing the default messaging client on their wireless device, a creator user 306A upgrading their wireless device to one that uses a different messaging client than their previous device, and/or the like. Migration of a group chat is effective specifically with respect to what messaging network serves the creator user 306A. In some instances, a group chat can migrate based on another user becoming labeled as the chat's creator (or administrator or host), with the new creator being associated with a different messaging network than the previous creator. Other participants of the group chat may or may not change (e.g., port, migrate) messaging networks.

As used herein, user porting may generally refer to user-driven changes in messaging network, such as a creator user switching to a new telecommunication provider. As used herein, user migration may generally refer to network-driven or operator-driven (or otherwise non-user-driven) changes in messaging network, such as an agreement between network operators for a given messaging network to take over messaging services for users. In some examples, user migration is executed or applied without explicitly providing prior notice to the migrated users. In some examples, user migration or user porting may occur through the configuration and use of a messaging client by a user. A user may use an over-the-top (OTT) messaging client (on their wireless device) that provides RCS capability served by a particular messaging network, which may be different than a messaging network used by a native messaging client or application on the user's wireless device. Accordingly, when the user's wireless device being configured to use the OTT messaging client instead of its native messaging client, the user begins to be served by a different messaging network. Depending on the example, the switch to the OTT messaging client may be user-driven (and represent a user porting) or may be network-driven (and represent a user migration).

In some embodiments, the creator user is specified by the metadata 308, and the role of "creator user" may change over time. For example, the group chat may be configured to allow addition and removal of participants and/or transfer of user roles. In instances where different users become the "creator user" over time, migration of the group chat occurs with respect to the "creator user" as identified by the metadata 308. For example, migration of the group chat may occur in response to the group chat's original creator user leaving or becoming disassociated with the group chat and the next appointed creator user being served by a different messaging network.

As shown in FIG. 3B, the first messaging network 302A continues storing the metadata 308 for the group chat subsequent to the creator user 306A porting or migrating out of the first messaging network 302A. All participants will still have their group chat traffic routed to the first messaging network 302A, thus resulting in a waste of signaling resources and utilization to the first messaging network 302A. For example, an INVITE or REVIVE INVITE sent by any participant will still include the conference focus URI that addresses the first messaging network 302A, instead of correctly addressing the second messaging network 302B (on account of the creator user's migration).

Figure 3C:
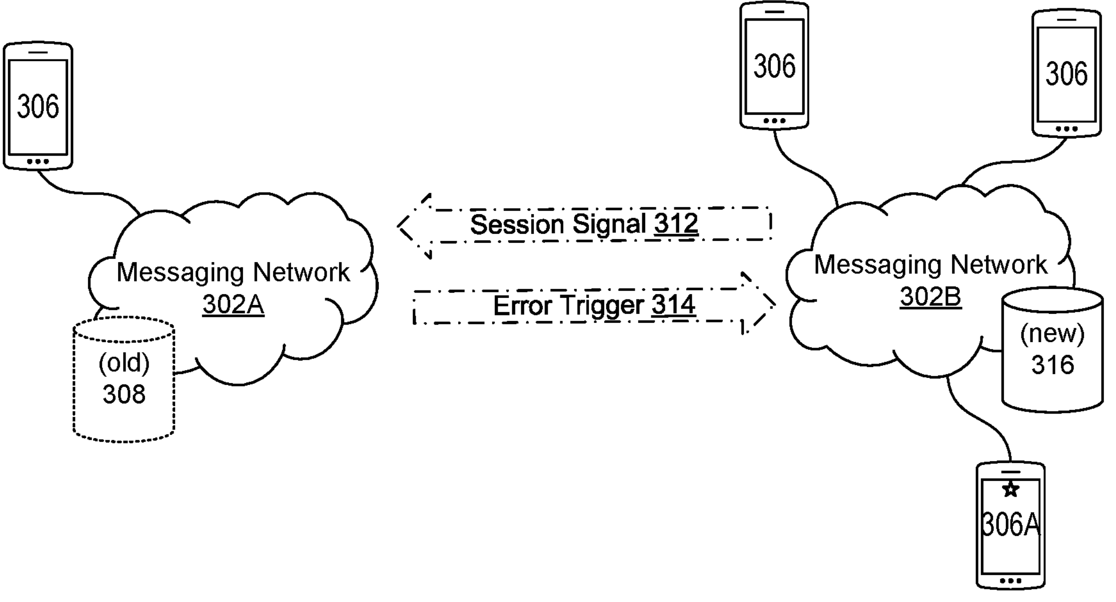

FIG. 3C demonstrates migration of the group chat's metadata to overcome the technical challenges resulting from the first messaging network 302A storing the metadata 308 after group chat migration. According to example embodiments, the first messaging network 302A may initiate migration of the group chat's metadata in response to a session signal 312 that the first messaging network 302A receives. In some embodiments, the session signal 312 is a protocol signal that causes the receiving network to access and use the metadata 308 in response. For example, the session signal 312 may be a REVIVE INVITE RCS signal that is indicative of a new message to be sent to the group chat participants. The users 306 may be configured to send a REVIVE INVITE RCS signal if the group chat has been dormant for at least a pre-configured amount of time. The pre-configured amount of time after which the group chat is considered dormant may be defined by the metadata 308 for the group chat, and the pre-configured amount of time may be provisioned according to a network-specific value. For example, group chats created with a given messaging network may by default have a different dormant time than group chats created with a different messaging network. In some embodiments, messaging networks consider group chats to be dormant or asleep after the pre-configured amount of time (e.g., three minutes) in order to save resources. Because the techniques described herein migrate metadata based on REVIVE signals, the techniques may not impose additional burden upon messaging networks when group chats are considered active, and instead cause the metadata migration to occur while a group chat is still considered dormant.

The first messaging network 302A receives the session signal 312 based on the session signal 312 being addressed to the first messaging network 302A. Despite being served by a new messaging network, a group chat participant may remain configured to address group chat signalling to the first messaging network 302A, due to the previous signalling from the first messaging network 302A during the group chat creation (e.g., a forked INVITE RCS signal). For example, the group chat participant remains configure to address the first messaging network 302A using the conference focus URI associated with the first messaging network 302A, that was previously provided to the group chat participant during group chat creation. In some instances, a non-creator group chat participant sending the session signal 312 is also agnostic to a porting or migration of the creator user 306A. In some instances, the creator user 306A is agnostic to the creator user 306A being migrated to the second messaging network 302B.

Upon receiving the session signal 312, the first messaging network 302A determines whether the group chat has migrated. The first messaging network's ability to determine whether the group chat has migrated may depend upon which user from which the session signal 312 originates. If the session signal 312 originates from the creator user 306A specifically, the first messaging network 302A may be able to determine that the group chat has migrated in instances of group chat migration caused by user porting and in instances of group chat migration caused by user migration. If the session signal 312 originates from a non-creator user, the first messaging network 302A may be able to determine that the group chat has migrated in instances of group chat migration caused by user migration.

In particular, the first messaging network 302A may determine that the group chat has migrated based on a failure to retrieve the metadata 308. In instances of user migration driven by the network operator, the metadata 308 may have been deleted, deprecated, or otherwise made unavailable once the user migration was effective. For example, FIG. 3C shows the metadata 308 at the first messaging network 302A being unavailable or deleted. Accordingly, the session signal 312 from any participant of the group chat will result in the first messaging network 302A not being able to retrieve the metadata 308. Based on the absence of metadata 308, the first messaging network 302A may conclude that the group chat has migrated (by way of user migration of its creator user).

Additionally, or alternatively, the first messaging network 302A may determine that the group chat has migrated based on an inspection of the session signal 312 itself. This inspection-based determination is effective for group chat migrations through user porting. The first messaging network 302A may detect that the creator user 306A has switched messaging networks (for reasons agnostic to first messaging network 302A) if the session signal 312 is received from another messaging network (e.g., the second messaging network 302B via the interface 304) and originates from the creator user 306A. In the illustrated example, a session signal 312 originating from the creator user 306A would be received at the first messaging network 302A via the second messaging network 302B. The first messaging network 302A would then detect, determine, or deduce that the creator user 306A has ported to the second messaging network 302B, and accordingly, that the group chat has migrated. Otherwise, if the creator user 306A remained associated with the first messaging network 302A (in the absence of user porting), the first messaging network 302A would not receive the session signal 312 via the second messaging network 302B.

If the messaging network 302A determines that the group chat has not migrated, it may use the metadata 308 (still existing at the first messaging network 302A) to handle the session signal 312 according to applicable messaging protocols. For example, the first messaging network 302A may use the metadata 308 to relay signals to all the participants of the group chat based on the session signal 312.

Otherwise, the first messaging network 302A determines that the group chat has migrated and causes metadata for the group chat to be (re-)established or (re-)provisioned at the second messaging network 302B. As illustrated in FIG. 3C, the first messaging network 302A may cause new metadata 316 to be generated, provisioned, and/or stored at the second messaging network 302B. If not already deleted, the metadata 308 at the first messaging network 302A is also deleted (or otherwise made unavailable) by the first messaging network 302A. As the new metadata 316 is created at the second messaging network 302B, the second messaging network 302B is able to apply or set network-specific configurations for the group chat, such as group size limit, file size limit, various permissions, and the like.

In some embodiments, the first messaging network 302A causes the new metadata 316 to be created at the second messaging network 302B via an error trigger 314 or an error signal. The error trigger 314 is configured to indicate to the group chat participant that the first messaging network 302A could not handle the session signal 312, thus causing the group chat participant to resend the session signal 312 or send a subsequent signal. In particular, in some embodiments, the error trigger 314 is configured to cause the group chat participant to send a subsequent or second signal that does not address the first messaging network 302A, and the subsequent or second signal is received and handled by the second messaging network 302B. In some embodiments, the error trigger 314 is a Session Initiation Protocol (SIP) 404 signal, and at least in RCS messaging protocol, the SIP 404 signal in response to a REVIVE INVITE RCS signal causes the group chat participant to send an ADHOC INVITE RCS signal without a conference focus URI.

In some embodiments, the error trigger 314 triggers an error process or error signalling performed between group chat participants and the second messaging network 302B. In this process, the second messaging network 302B may receive a session signal 312 that is resent, or a second signal that does not address the first messaging network 302A (e.g., an ADHOC INVITE), and in response, the second messaging network 302B begins hosting the group chat by storing the new metadata 316 and sending out signals (e.g., INVITE RCS signals) to the group chat participants so that each participant is aware that the second messaging network 302B is now hosting the group chat. For example, each participant receives a conference focus URI associated with the second messaging network 302B to be used in their subsequent signalling for the group chat (replacing the previous conference focus URI associated with the first messaging network 302A).

In some embodiments, the resent or second signal sent to the second messaging network 302B includes at least some of the metadata 308 previously defining the group chat, or at least a version of the metadata 308 local to the group chat participant. Thus, the second messaging network 302B is able to recreate or replicate the metadata with the new metadata 316 using the information included in the error signalling that follows the error trigger 314.

Thus, by sending the error trigger 314, the first messaging network 302A is able to leverage error handling or signalling defined within a messaging protocol (e.g., RCS messaging protocol) that causes the group chat's metadata to be re-established or replicated at the second messaging network 302B, without further direct involvement by the first messaging network 302A.

Figure 4:
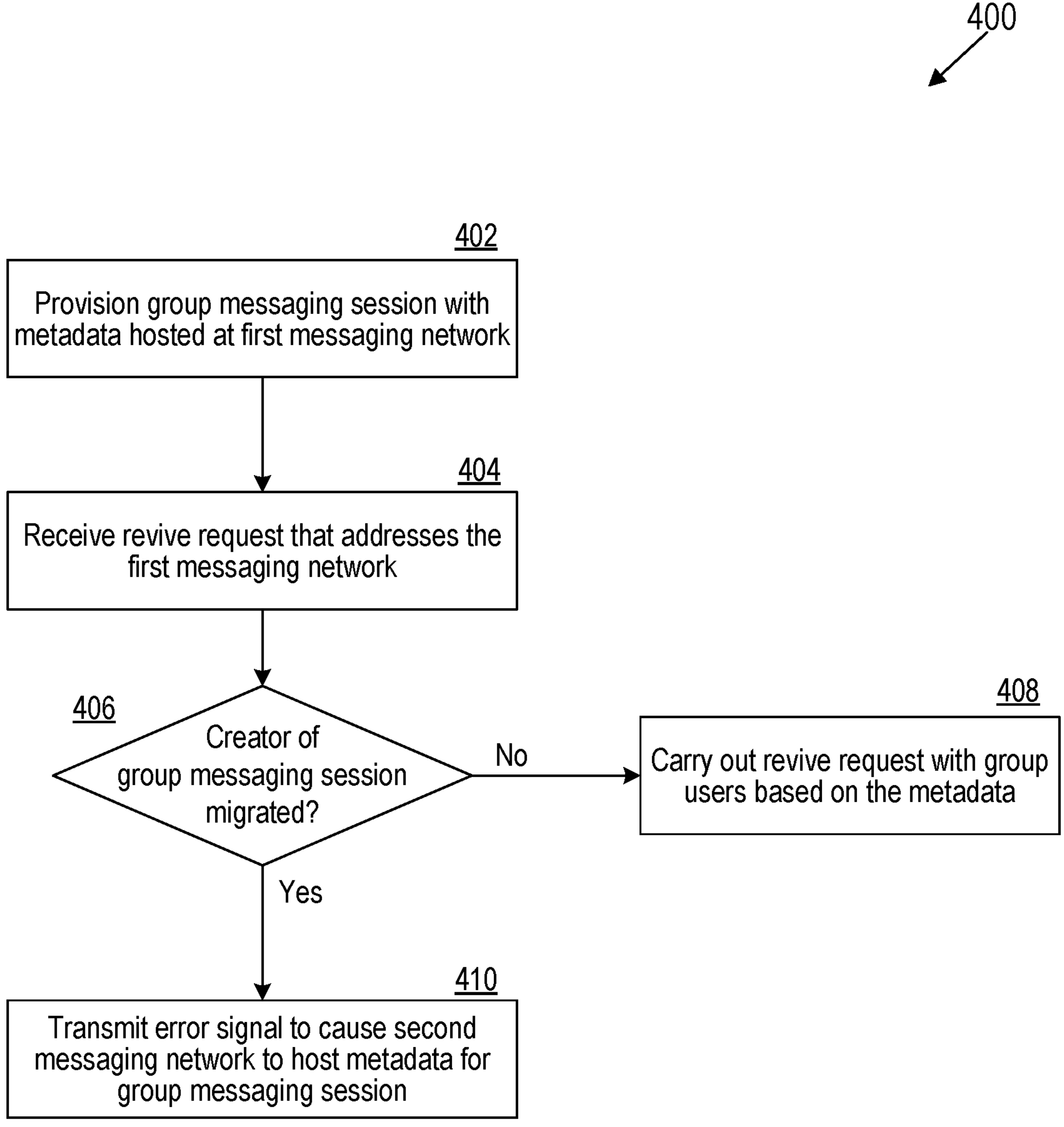
FIG. 4 is a flow diagram including operations for seamlessly migrating metadata for group messaging sessions across messaging networks.

FIG. 4 is a flow diagram that illustrates a method 400 for seamlessly migrating metadata for group chats or group messaging sessions across messaging networks. In some embodiments, the operations are performed by a messaging network, or a system associated therewith. For example, the operations may be implemented or performed by one or more application servers of a telecommunication network that embody a messaging infrastructure within the telecommunication network. In another example, the operations may be implemented or performed by one or more computing systems within a cloud and/or distributed platform that provides messaging services within an ecosystem.

At block 402, a system associated with a first (or origin) messaging network provisions a group messaging session or a group chat, which includes creating, storing, and hosting metadata at the first messaging network. In some embodiments, the metadata is provisioned and configured according to a messaging protocol such as RCS protocol. The system provisions the group chat in response to a session creation request from a creator user for the group chat, and the group chat includes a plurality of users or participants including the creator user. In some embodiments, the metadata includes at least one network-specific configuration or value, or a configuration or value that is controlled by the first messaging network (or its operator). In some embodiments, provisioning the group chat includes providing an address, an identifier, and/or the like associated with the first messaging network (e.g., a conference focus URI) to each participant of the group chat, so that each participant can address later signalling for the group chat to the first messaging network.

At block 404, the system receives a revive request for the group chat that addresses the first messaging network. The revive request is indicative of a new message for the group chat being prepared by one of the users or participants, for example, after a period of time that the group chat has been dormant. For example, the revive request is a REVIVE INVITE RCS signal. According to the messaging protocol for the group chat, the revive request is configured to cause the first messaging network to use the metadata, at least to fork signalling to the other participants in the group chat. Because the participants in the group chat may not necessarily be associated with the first messaging network, forking the signalling using the metadata may entail relaying the signalling through one or more other messaging networks to reach the other participants. In some embodiments, the metadata may indicate the messaging network by which a given participant may be reached.

At decision block 406, the system determines, in response to the revive request, whether the group chat has migrated, or whether the first messaging network remains responsible for serving the creator user of the group chat. As discussed later with FIGS. 5A and 5B, the system may detect group chat migration under one or both of user porting and user migration of the creator user.

The system proceeds to block 408 if the system determines that the group chat has not migrated. At block 408, the system may handle the revive request according to the underlying messaging protocol. For example, the system will break out the revive request to all the group chat participants and deliver the new message, using the metadata for the group chat.

Otherwise, the system proceeds to block 410 if the system determines that the group chat has migrated. At block 410, the system transmits an error signal to cause a second (or target, new) messaging network to host the metadata for the group chat. The error signal may trigger an error process or error signalling defined by the underlying messaging protocol for re-establishing the group chat's metadata at the currently-serving messaging network, or the second messaging network. For example, the error signal is transmitted and relayed to the group chat's creator user to cause the creator user to send an ADHOC INVITE RCS signal to its currently-serving messaging network, which is the second messaging network, and the ADHOC INVITE RCS signal causes the currently-serving messaging network to host the group chat's metadata. The system also causes the first messaging network to clean up its set of metadata, if the first messaging network has not already done so.

Figure 5A:
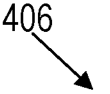
FIGS. 5A-5B are flow diagrams that include operations for determining whether a group messaging session has migrated across messaging networks.
Figure 5A:
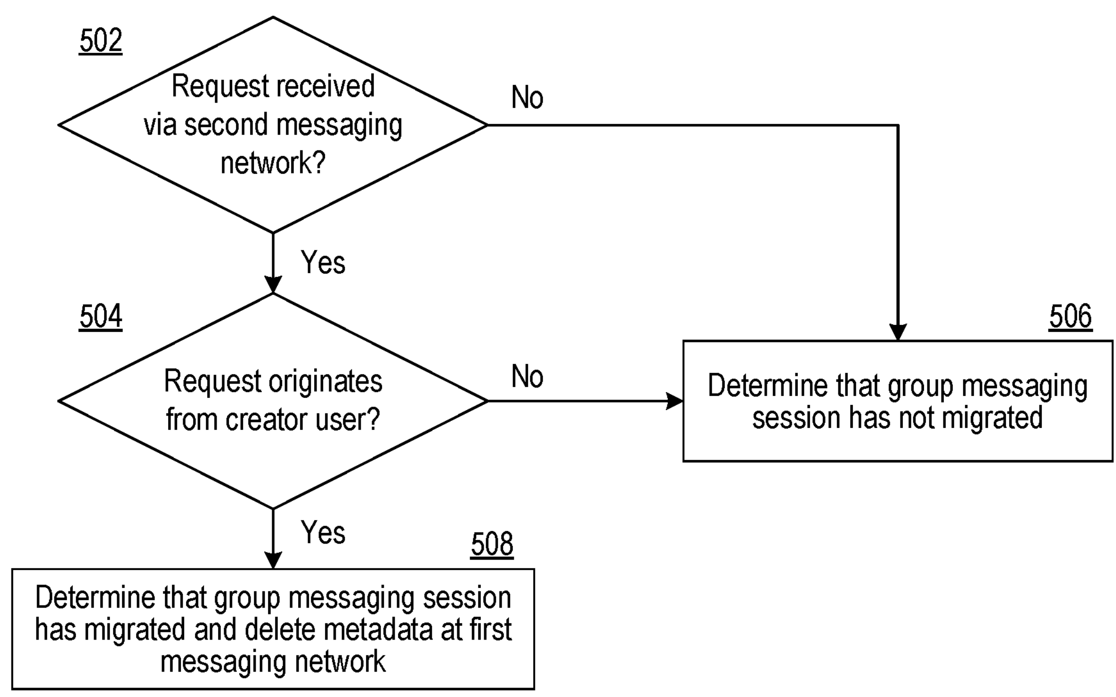

Returning to decision block 406, the system may detect either one of a group chat migration caused by user porting or a group chat migration caused by user migration. FIG. 5A illustrates operations for determining a group chat migration based on user porting. At decision block 502, the system determines whether the revive request is received via another messaging network. In some embodiments, the system determines that the revive request is received or relayed from another messaging network based on the revive request being received via a network-to-network interface (NNI) leg with another messaging network.

If the revive request is not received from another messaging network, then the system may proceed to block 506 and determine that the group chat has not migrated. Otherwise, at decision block 504, the system determines whether the revive request originates from the creator user. In some embodiments, the revive request identifies the group chat participant that sent the revive request, for example, based on including an identifier such as a phone number or a mobile station international subscriber directory number (MSISDN) associated with the group chat participant. Accordingly, the system may reference the identifier (e.g., the MSISDN) with the metadata for the group chat, which indicates which of the plurality of MSISDNs representing the participants is associated with the creator user.

If the revive request does not originate from the creator user, then the system at block 506 determines that the group chat migration. Otherwise, if the revive request does originate from the creator user, the system at block 508 determines that the group chat has migrated. Accordingly, in some embodiments, the system may determine, in this inspection-based technique, that the group chat has migrated if both of two conditions are fulfilled: (i) the request arrives from another messaging network, and (ii) the request originates from the creator user. In some embodiments, the system may also delete the metadata in response to determining that the group chat has migrated at block 508.

Figure 5B:
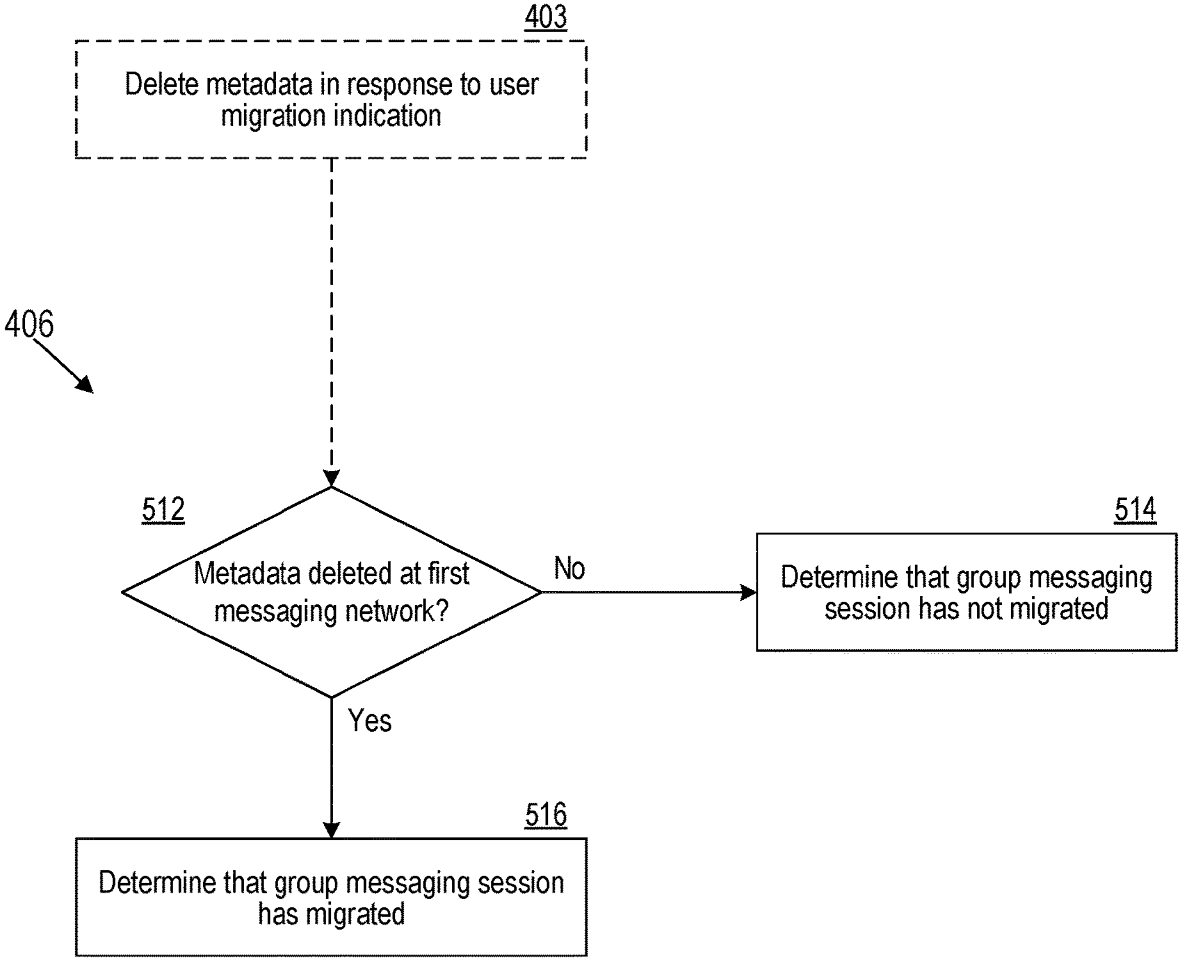

FIG. 5B illustrates operations for determining whether a group messaging session has migrated on the basis of user migration. As discussed above, user migration may be driven by the network operator (e.g., based on a service agreement to configure OTT messaging clients on network subscriber wireless devices), or the first messaging network may be previously made aware of the user migration. These user migrations may affect multiple users and may include a provisioning trigger being sent to the first messaging network. Thus, at block 403, the system associated with the first messaging network may delete metadata for group chats in which the users affected by the user migration are indicated as creator users. The system may do so independently and/or prior to receiving the signalling from a group chat participant (e.g., in block 404).

Accordingly, to determine whether the group chat has migrated (under decision block 406), the system at decision block 512 determines whether the metadata for the group chat is available or accessible or if the metadata has been deleted. If the metadata is still available, the system may determine, at block 514, that the group chat has not migrated. Otherwise, if the metadata is not available and has been deleted, the system may determine, at block 516, that the group chat has migrated.

In some embodiments, the system performs both modes of checking whether the group chat has migrated. For example, after determining that the metadata has not been deleted yet (block 514), the system may proceed to inspect the revive request according to the operations of FIG. 5A. In some embodiments, the system deletes the metadata in response to an inspection-based detection of group chat migration, and the transmission of the error signal (block 410) is performed in response to the metadata being unavailable or inaccessible. For example, the system executes a first process that performs the inspection-based detection and metadata deletion (e.g., a clean-up process such as FIG. 5A), and the system also executes a main process that is simply configured to transmit an error signal if the metadata is inaccessible. In doing so, the system can implement the first process or clean-up process separate from a main process that adheres to the underlying messaging protocol.

Example Computer Systems

Figure 6:
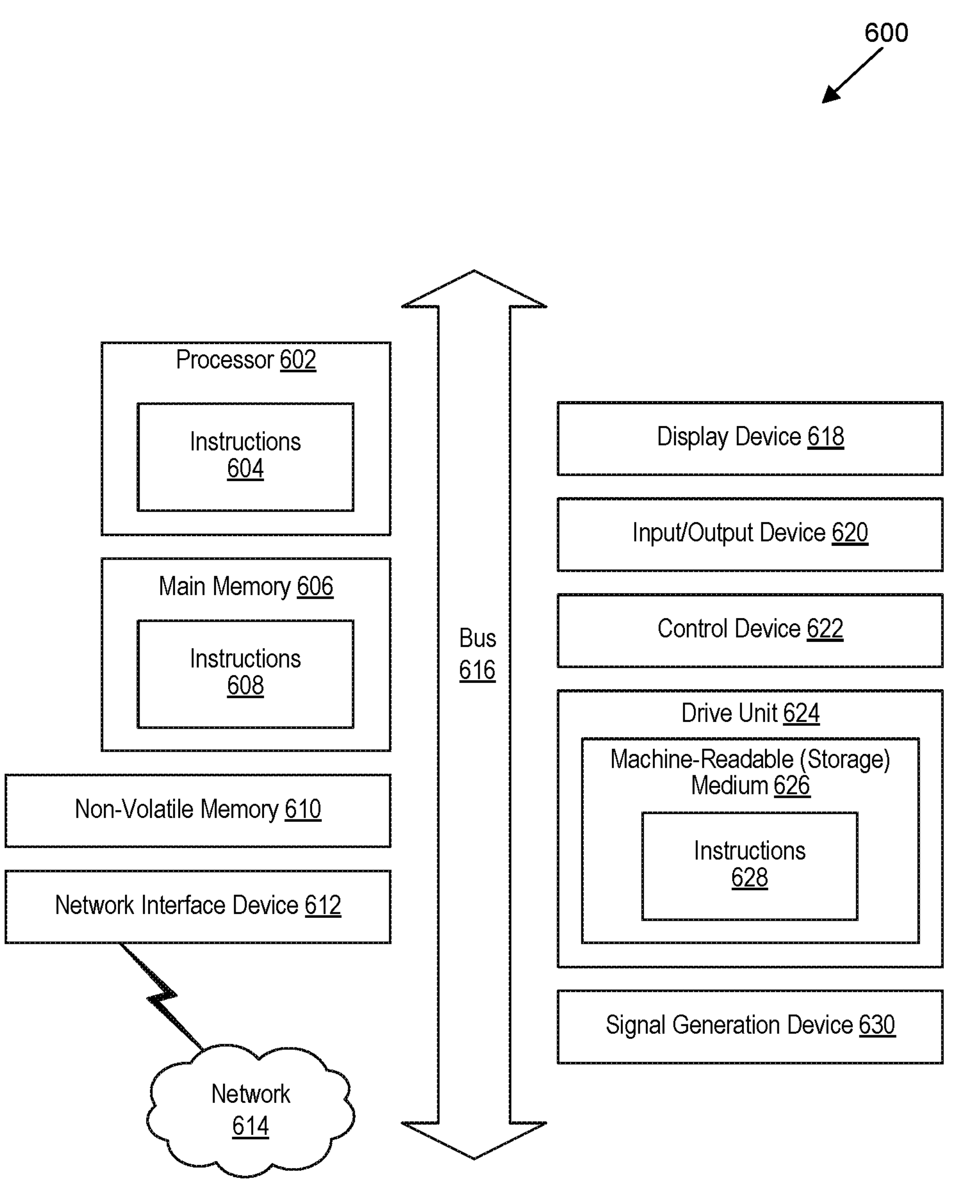
FIG. 6 is a block diagram that illustrates an example of a computer system in which at least some operations described herein can be implemented.

FIG. 6 is a block diagram that illustrates an example of a computer system 600 in which at least some operations described herein can be implemented. As shown, the computer system 600 can include: one or more processors 602, main memory 606, non-volatile memory 610, a network interface device 612, a video display device 618, an input/output device 620, a control device 622 (e.g., keyboard and pointing device), a drive unit 624 that includes a machine-readable (storage) medium 626, and a signal generation device 630 that are communicatively connected to a bus 616. The bus 616 represents one or more physical buses and/or point-to-point connections that are connected by appropriate bridges, adapters, or controllers. Various common components (e.g., cache memory) are omitted from FIG. 6 for brevity. Instead, the computer system 600 is intended to illustrate a hardware device on which components illustrated or described relative to the examples of the figures and any other components described in this specification can be implemented.

The computer system 600 can take any suitable physical form. For example, the computing system 600 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 600. In some implementations, the computer system 600 can be an embedded computer system, a system-on-chip (SOC), a single-board computer system (SBC), or a distributed system such as a mesh of computer systems, or it can include one or more cloud components in one or more networks. Where appropriate, one or more computer systems 600 can perform operations in real time, in near real time, or in batch mode.

The network interface device 612 enables the computing system 600 to mediate data in a network 614 with an entity that is external to the computing system 600 through any communication protocol supported by the computing system 600 and the external entity. Examples of the network interface device 612 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 606, non-volatile memory 610, machine-readable medium 626) can be local, remote, or distributed. Although shown as a single medium, the machine-readable medium 626 can include multiple media (e.g., a centralized/distributed database and/or associated caches and servers) that store one or more sets of instructions 628. The machine-readable medium 626 can include any medium that is capable of storing, encoding, or carrying a set of instructions for execution by the computing system 600. The machine-readable medium 626 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 610, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 604, 608, 628) set at various times in various memory and storage devices in computing device(s). When read and executed by the processor 602, the instruction(s) cause the computing system 600 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

The invention claimed is:

1. A non-transitory, computer-readable storage medium comprising instructions recorded thereon, wherein the instructions when executed by at least one data processor of a first messaging network, cause the first messaging network to:

in response to a session creation request received from a first user, provision a group messaging session for a plurality of users including the first user, the group messaging session being provisioned with a set of rich communication services (RCS) metadata that is stored and managed at the first messaging network, wherein the set of RCS metadata comprises at least one network-specific configuration of the group messaging session associated with the first messaging network;

receive a session revive request that addresses the first messaging network and identifies the group messaging session, the session revive request being indicative of a new message for the group messaging session being prepared by one of the plurality of users;

determine (i) whether the session revive request is received via an interface between the first messaging network and a second messaging network, and (ii) whether the one of the plurality of users indicated by the session revive request is the first user according to the set of RCS metadata;

based on determining that the session revive request is received via the interface with the second messaging network and that the session revive request indicates the first user, delete the set of RCS metadata; and transmit an error signal to a wireless device operated by the first user, the error signal configured to trigger the wireless device to interface with the second messaging network such that the set of RCS metadata for the group messaging session is stored and managed at the second messaging network and comprises at least one network-specific configuration of the group messaging session associated with the second messaging network.

2. The non-transitory, computer-readable storage medium of claim 1, wherein the session revive request is received via the second messaging network based on the first user having a telecommunications service subscription with the second messaging network instead of the first messaging network.

3. The non-transitory, computer-readable storage medium of claim 1, wherein the session revive request is received via the second messaging network due to the wireless device being configured with an over-the-top (OTT) messaging client that causes the wireless device to transmit the session revive request to the second messaging network instead of the first messaging network.

4. The non-transitory, computer-readable storage medium of claim 1, wherein the error signal is relayed to the wireless device via the second messaging network.

5. A method comprising:

provisioning, by a first messaging network, a group messaging session for a plurality of users based on storing a set of metadata, wherein the set of metadata identifies a creator user within the plurality of users;

receiving, by the first messaging network, a session revive request addressed to the first messaging network and indicative of a new message by a particular user of the plurality of users for the group messaging session;

determining, by the first messaging network, that the group messaging session has migrated to a second messaging network based on the creator user being associated with the second messaging network; and in accordance with determining that the group messaging session has migrated to the second messaging network, transmitting, by the first messaging network, an error response for the session revive request to the particular user, the error response configured to trigger a process by which the second messaging network stores the set of metadata for the group messaging session instead of the first messaging network.

6. The method of claim 5, further comprising:

receiving an indication of one or more users who have become associated with the second messaging network, the one or more users including the creator user identified by the set of metadata for the group messaging session; and in response to the indication, deleting the set of metadata for the group messaging session prior to the session revive request being received, wherein determining that the group messaging session has migrated is based on determining that the set of metadata has been deleted, which is indicative that the creator user is associated with the second messaging network.

7. The method of claim 5, further comprising:

in response to determining that the group messaging session has migrated to the second messaging network, deleting the set of metadata for the group messaging session.

8. The method of claim 5, further comprising:

determining that the creator user is associated with the second messaging network based on (i) the session revive request being received via an interface between the first messaging network and the second messaging network, and (ii) the particular user being the creator user according to the set of metadata.

9. The method of claim 5, wherein the creator user is associated with the second messaging network based on using an OTT messaging client application configured to interface with the second messaging network instead of the first messaging network.

10. The method of claim 5, wherein the process triggered by the error response comprises causing the particular user to no longer address the first messaging network for requests associated with the group messaging session.

11. The method of claim 5, wherein at least one of the set of metadata for the group messaging session is a network-specific configuration that is different when the second messaging network stores the set of metadata for the group messaging session.

12. The method of claim 5, wherein transmitting the error response comprises relaying the error response to the particular user via the second messaging network.

13. A system for a first messaging network, comprising:

at least one hardware processor; and at least one non-transitory memory storing instructions, which, when executed by the at least one hardware processor, cause the system to:

provision a group messaging session for a plurality of users based on storing a set of metadata, wherein the set of metadata identifies a creator user within the plurality of users;

receive a session revive request addressed to the first messaging network and indicative of a new message by a particular user of the plurality of users for the group messaging session;

determine that the group messaging session has migrated to a second messaging network based on the creator user being associated with the second messaging network; and in accordance with determining that the group messaging session has migrated to the second messaging network, transmit an error response for the session revive request to the particular user, the error response configured to trigger a process by which the second messaging network stores the set of metadata for the group messaging session instead of the first messaging network.

14. The system of claim 13, wherein the instructions cause the system to:

receive an indication of one or more users who have become associated with the second messaging network, the one or more users including the creator user identified by the set of metadata for the group messaging session; and in response to the indication, deleting the set of metadata for the group messaging session prior to the session revive request being received, wherein determining that the group messaging session has migrated is based on determining that the set of metadata has been deleted.

15. The system of claim 13, wherein the instructions cause the system to:

in response to determining that the group messaging session has migrated to the second messaging network, delete the set of metadata for the group messaging session.

16. The system of claim 15, wherein determining that the group messaging session has migrated to the second messaging network comprises determining that (i) the session revive request is received via an interface between the first messaging network and the second messaging network, and (ii) the particular user is the creator user according to the set of metadata.

17. The system of claim 13, wherein the creator user is associated with the second messaging network based on using an OTT messaging client application configured to interface with the second messaging network instead of the first messaging network.

18. The system of claim 13, wherein the creator user is associated with the second messaging network based on the creator user having a telecommunications service subscription with the second messaging network.

19. The system of claim 13, wherein at least one of the set of metadata for the group messaging session is a network-specific configuration that is different when the second messaging network stores the set of metadata for the group messaging session.

20. The system of claim 13, wherein provisioning the group messaging session comprises storing the set of metadata at one or more application functions belonging to a core network of a wireless telecommunications network with which the first messaging network is associated.

* * * * *